(12) United States Patent
Paas

(10) Patent No.: US 6,502,392 B1
(45) Date of Patent: Jan. 7, 2003

(54) INDUCTION COOLED EXHAUST FILTRATION SYSTEM

(75) Inventor: Norbert Paas, Louisville, CO (US)

(73) Assignee: Dry Systems Technologies, Louisville, CO (US)

( * ) Notice: Subject to any disclaimer, the term of this patent is extended or adjusted under 35 U.S.C. 154(b) by 0 days.

(21) Appl. No.: 09/130,083

(22) Filed: Aug. 7, 1998

(51) Int. Cl.⁷ .................................................. F01N 3/02
(52) U.S. Cl. .............................. 60/307; 60/311; 60/315; 60/299
(58) Field of Search ........................ 60/311, 274, 315, 60/297, 299, 310, 321, 302; 55/DIG. 30, 84, 80, 222, 268

(56) References Cited

U.S. PATENT DOCUMENTS

| | | | |
|---|---|---|---|
| 1,109,547 A | | 9/1914 | Robinson |
| 1,901,381 A | | 3/1933 | Smith |
| 2,116,718 A | | 5/1938 | Stubbs |
| 2,806,347 A | * | 9/1957 | Pertile .......................... 60/315 |
| 3,116,596 A | | 1/1964 | Boehme et al. |
| 3,236,045 A | * | 2/1966 | Berger et al. ................. 60/274 |
| 3,393,668 A | * | 7/1968 | Milgram ........................ 60/311 |
| 3,417,549 A | * | 12/1968 | Leosis ........................... 60/311 |
| 3,666,422 A | * | 5/1972 | Rossel .......................... 60/297 |
| 3,861,142 A | * | 1/1975 | Bose ............................ 60/274 |
| 5,243,819 A | * | 9/1993 | Woerner et al. ............... 60/274 |
| 5,272,874 A | | 12/1993 | Paas |
| 5,469,702 A | * | 11/1995 | Tuma et al. ................... 60/311 |

* cited by examiner

Primary Examiner—Willis R. Wolfe
Assistant Examiner—Sneh Varma
(74) Attorney, Agent, or Firm—Bruce E. Dahl, Esq.; Dahl & Osterloth, L.L.P.

(57) ABSTRACT

An exhaust filtration system for filtering exhaust gases produced by an internal combustion engine may comprise a fan having an intake side and a discharge side and an air inlet operatively associated with the intake side of the fan. A filter having an inlet surface and an outlet surface is positioned adjacent the fan so that the inlet surface of the filter is positioned adjacent the discharge side of the fan. An influx tube connected to the internal combustion engine is positioned so that its outlet end is located adjacent the intake side of the fan, so that the fan draws in air from the air inlet and exhaust gases from the outlet end of the influx tube and discharges a mixture of air and exhaust gases from the discharge side and into the inlet surface of the filter.

23 Claims, 3 Drawing Sheets

INDUCTION COOLED EXHAUST FILTRATION SYSTEM

FIELD OF INVENTION

This invention relates to emissions control systems for internal combustion engines in general and more specifically to systems for removing particulate matter from the exhaust gases produced by diesel engines.

BACKGROUND

One problem associated with the use of internal combustion engines, such as gasoline engines and diesel engines, arises from the formation of particulate matter during the combustion process. As is well-known, the presence in the exhaust gases of such particulate matter contributes to the undesirable emissions produced by such engines. Generally speaking, the solid particulate matter (i.e., soot) in diesel engine exhaust comprises small, solid, irregularly shaped particles, which are themselves agglomerates of smaller particles. The solid particulate matter may often have high molecular weight hydrocarbons absorbed on their surfaces. Frequently, the particulate matter is a complex mixture of pure carbon and various kinds of organic materials, and the sizes may range from very small particles of about 0.01 microns to relatively large clusters having sizes in the range of 10–30 microns, giving the particulate an extremely fine and light, flour-like consistency. Turbo-supercharged diesel engines tend to emit more of the smaller particles with much lower levels of retained organic compounds. However, regardless of the composition of the particulate matter, it tends to impose significant difficulties on the successful use of diesel engines in certain environments and for certain applications.

Many different types of exhaust treatment systems have been developed in an attempt to remove or eliminate the particulate matter before it is released into the atmosphere. Such systems almost always use some type of filter to trap the particles in the exhaust stream. Ceramic materials, stainless steel wire mesh, and other filter materials capable of withstanding the high-temperature exhaust gases have been tried and are being used with some degree of success. Unfortunately, because of the large quantities of particulate matter that are generated by most diesel engines, most filters tend to clog quickly, which increases back pressure in the engine exhaust and adversely affects the performance and efficiency of the engine. Of course, one remedy is to replace the filter when the back pressure exceeds some predetermined limit. However, the metal or ceramic filter materials used in most exhaust filters are expensive, so it is not practical to throw away the filters when they become clogged. As a result, several filter regeneration methods have been developed in attempts to solve the clogging problem. Unfortunately, the space, cost, and energy consumption required by such regeneration methods are substantial. Furthermore, in-situ filter regeneration techniques, where the filters rely on the hot exhaust gases themselves to raise the temperature of the filter to a level sufficient to oxidize the trapped particles, cannot be used with engines that operate under light duty-cycles.

Another type of exhaust treatment system, described in U.S. Pat. No. 5,272,874 entitled "Exhaust Treatment System," which is incorporated herein by reference for all that it discloses, represents a significant breakthrough in exhaust filtration technology. The system described in that patent utilizes a water cooled heat exchanger to lower the temperature of the exhaust gases, thereby allowing an inexpensive, low-temperature filter material to be used to trap exhaust-borne particles.

While the low-temperature particulate filter described in the foregoing patent is effective in removing the particulate matter with a high collection efficiency, it is not without its drawbacks. For example, the water cooled heat exchanger required to cool the exhaust gases represents an additional component which tends to add to the overall size, weight, and cost of the engine system, which can be a factor in certain applications.

Consequently, there remains a need for an improved exhaust gas filtration system that can effectively remove particulate matter from exhaust gases. Ideally, such a system should be capable of utilizing a low-temperature disposable particulate filter, which affords significant advantages, but without requiring a water cooled heat exchanger or other such device to lower the temperature of the exhaust gases to the point where such a low temperature filter may be used.

SUMMARY OF THE INVENTION

An induction cooled exhaust filtration system for filtering exhaust gases produced by an internal combustion engine may comprise a fan having an intake side and a discharge side and an ambient air inlet operatively associated with the intake side of the fan. A filter having an inlet surface and an outlet surface is positioned adjacent the fan so that the inlet surface of the filter is positioned adjacent the discharge side of the fan. An influx tube connected to the internal combustion engine is positioned so that its outlet end is located adjacent the intake side of the fan, so that the fan draws in air from the ambient air inlet and exhaust gases from the outlet end of the influx tube and discharges a mixture of air and exhaust gases from the discharge side and into the inlet surface of the filter.

Also disclosed is a method for filtering exhaust gases that comprises the steps of: Mixing the exhaust gases with ambient air to produce diluted exhaust gases; passing the diluted exhaust gases through a filter so that the filter removes particulate matter contained within the diluted exhaust gases; and discharging the filtered diluted exhaust gases into the atmosphere.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
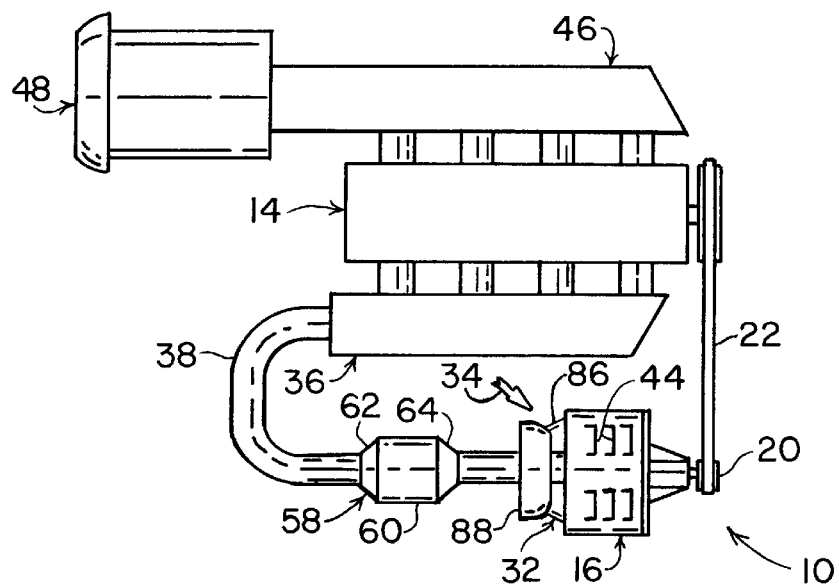
FIG. 1 is a schematic representation of an induction cooled exhaust filtration system according to one embodiment of the present invention as it may be used to filter the exhaust produced by a diesel engine.
Figure 2:
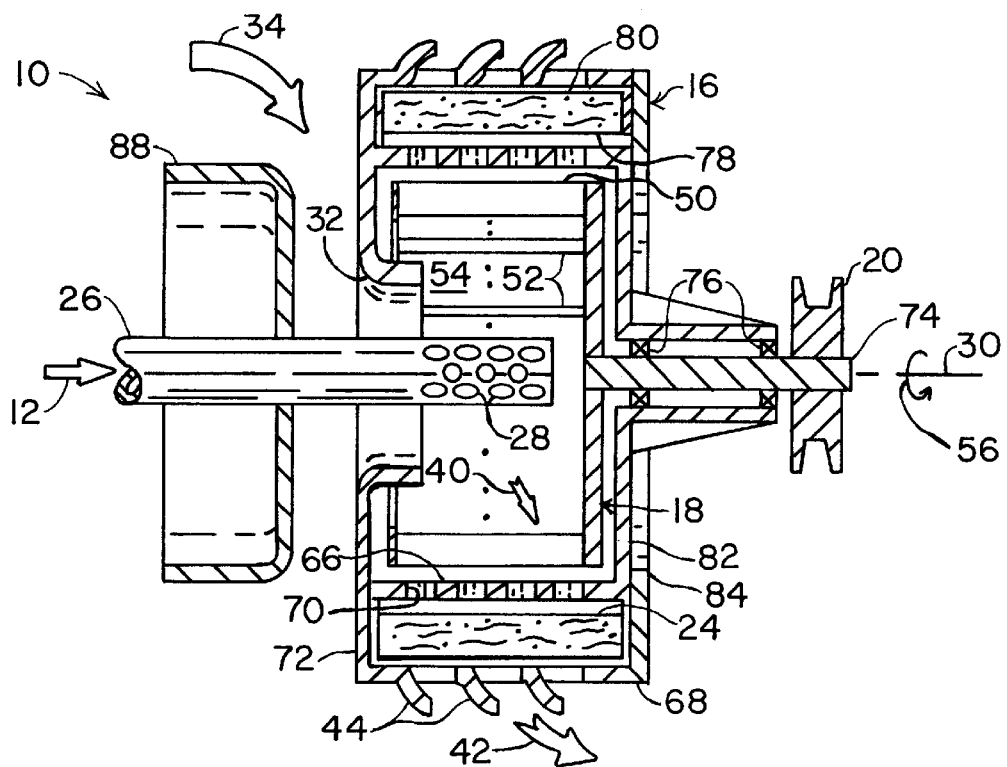
FIG. 2 is an enlarged cross-section of the exhaust filtration system shown in FIG. 1 more clearly showing the arrangement of the fan, filter, and perforated influx tube.

An induction cooled exhaust filtration system 10 is shown in FIG. 1 as it could be used to cool and filter exhaust gases 12 (FIG. 2) produced by an internal combustion engine, such as diesel engine 14. Referring now primarily to FIG. 2, the exhaust filtration system 10 may comprise a housing 16 sized to receive a fan or blower assembly 18, a filter element 24, and an exhaust influx tube 26. The housing 16 may also be provided with an ambient air inlet 32. The fan or blower assembly 18 may comprise a centrifugal fan 50 having a plurality of impellers 52. Centrifugal fan 50 pumps air generally radially outwardly from the interior region 54 of centrifugal fan 50. In one embodiment, the centrifugal fan 50 may be driven by the engine 14 via a pulley 20 and drive belt 22 so that the centrifugal fan 50 rotates about the fan axis 30 in the direction generally indicated by arrow 56. See also FIG. 1. Alternatively, other drive arrangements may also be used, as will be described in greater detail below.

The centrifugal fan 50 may be surrounded by the filter element 24, as best seen in FIG. 2. Filter element 24 removes a substantial amount of the particulate matter entrained in the exhaust gases in the manner that will be described below. The exhaust gas influx tube 26 may be provided with one or more holes or perforations 28 therein and may be positioned concentrically with the fan axis 30. The exhaust gas influx tube 26 may be connected to the exhaust manifold 36 of engine 14 via any convenient conduit member, such as by an exhaust pipe assembly 38.

The exhaust filtration system 10 may be operated as follows to remove a substantial portion of the particulate matter (not shown) entrained in the exhaust gases 12 produced by the engine 14. More specifically, the exhaust gases 12 from the engine 14 pass through the perforations 28 in the influx tube 26 and enter the interior region 54 of centrifugal fan 50. The withdrawal of the exhaust gases 12 from the perforations 28 in the influx tube 26 is aided by the pressure differential produced by the rotating centrifugal fan 50. The rotating fan 50 also draws in ambient air 34 through the ambient air inlet assembly 32. The ambient air 34 mixes with the hot exhaust gases 12 exiting the influx tube 26 in the interior region 54 of centrifugal fan 50, thereby forming cooled and diluted exhaust gases 40. The cooled, diluted exhaust gases 40 are then pumped by the centrifugal fan 50 through the filter element 24. Filter element 24 removes particulate matter (not shown) entrained in the cooled, diluted exhaust gases 40. The resulting filtered exhaust gases 42 then exit the housing 16 via a plurality of louvers 44 which may be provided in the outer wall 68 of housing 16.

A significant advantage associated with the present invention is that it removes a substantial portion of the particulate matter entrained in the exhaust gases 12 produced by the engine 14, thereby significantly reducing the amount of harmful emissions produced by the engine 14. The significantly reduced particulate emissions allow an engine provided with the exhaust filtration system according to the present invention to be utilized in poorly ventilated or closed environments, such as, for example, in underground mines. Still other advantages are associated with the exhaust gas dilution provided by the present invention. For example, diluting the exhaust gases with large quantities of ambient air lowers the temperature of the exhaust gases to the point where a low-temperature paper filter 24 may be used to capture the particulate matter entrained in the exhaust gases. Diluting the exhaust gases with ambient air also dispenses with the need to provide an air or water cooled heat exchanger to cool the exhaust gases.

Having briefly described one embodiment 10 of the exhaust filtration system according to the present invention, as well as some of its more significant features and advantages, the various embodiments of the exhaust filtration system will now be described in detail. However, before proceeding with the detailed description, it should be noted that while the various embodiments of the exhaust filtration system are shown and described herein as they could be used with a diesel engine system of the type utilized in underground coal mines, they could also be used with other types of internal combustion engines and in other applications. For example, in addition to being used in conjunction with engines used for in underground coal mines, the exhaust filtration system could be used in conjunction with engines utilized in other applications, such as to power land or marine vehicles or in power generation systems. The exhaust filtration system according to the present invention may also be utilized with conventional gasoline or spark ignition engines in any of a wide range of applications. Consequently, the various embodiments of the exhaust filtration system according to the present invention should not be regarded as being limited to the particular engines and applications shown and described herein.

With the foregoing considerations in mind, a first embodiment 10 of the exhaust filtration system is shown in FIGS. 1 and 2 as it could be used to filter the exhaust gases 12 produced by a diesel engine 14 of the type intended for use with underground mining equipment and vehicles. Essentially, the diesel engine 14 may be provided with an intake manifold 46 as well as an intake air filter 48. An exhaust manifold 36 connected to the engine 14 collects the exhaust gases 12 produced by the engine 14. As was discussed above, the engine 14 may comprise any of a wide range of internal combustion engines, such as compression ignition or diesel engines and spark ignition or gasoline engines. Consequently, the present invention should not be regarded as limited to any particular type of internal combustion engine shown and described herein. By way of example, in one preferred embodiment, the engine 14 may comprise a model C-240 diesel engine available from Isuzu of Detroit, Mich.

The exhaust filtration system 10 may be connected to the exhaust manifold 36 of the engine 14 by any convenient conduit member, such as exhaust pipe 38, so that the exhaust filtration system 10 receives substantially all of the exhaust gases 12 produced by the engine 14. It is preferred, but not required, that the engine 14 also be provided with a catalyst assembly 58. The main advantage associated with the catalyst assembly 58 is that the catalyst (not shown) contained therein reduces to some extent the amount of particulate matter contained within the exhaust gases 12. The catalyst assembly 58 also reduces the quantity of unburned hydrocarbons and carbon monoxide in the exhaust gases as well.

The catalyst assembly 58 may comprise any of a wide range of catalysts commonly used with diesel engines, the selection of which would be obvious to persons having ordinary skill in the art depending on the particular engine and/or application. For example, one such catalyst assembly 58 may comprise a generally cylindrically shaped external housing 60 having an inlet end 62 and an outlet end 64. The inlet end 62 may be connected to the exhaust pipe 38, while the outlet end 64 may be connected to the exhaust influx tube 26 associated with the exhaust filtration system 10. The external housing 60 is adapted to receive a catalyst bed (not shown) containing a catalyst material, such as platinum, palladium, rhodium, etc., suitable for catalyzing the exhaust gases 12 from the engine 14. By way of example, one preferred embodiment uses a catalyst assembly available from Syncat of Louisville, Colo., as model no. S08.

Referring now primarily to FIG. 2, the exhaust filtration system 10 may comprise a generally cylindrically shaped housing 16 sized to receive the fan or blower assembly 18, the filter element 24, and the exhaust gas influx tube 26. In one embodiment, the housing 16 may comprise a generally cylindrically shaped member having a cylindrically shaped inner wall 66 and a cylindrically shaped outer wall 68. The cylindrically shaped inner wall 66 may be provided with one or more holes or apertures 70 therein to allow air pumped by the fan 50 to enter the filter element 24 contained within the annulus defined between the inner and outer walls 66 and 68. The outer wall 68 may also be provided with one or more apertures, such as louvers 44, to allow filtered exhaust gases 42 to exit the housing 16. Housing 16 may also be provided with a rear panel 72 having an ambient air inlet 32 therein in the manner shown in FIG. 2.

The housing 16 may be made from any of a wide range of materials, such as metals or plastics, suitable for the intended application. Consequently, the present invention should not be regarded as limited to housings made from any particular material. By way of example, in one preferred embodiment, the housing 16 is made from steel, although other materials could also be used.

Figure 6:
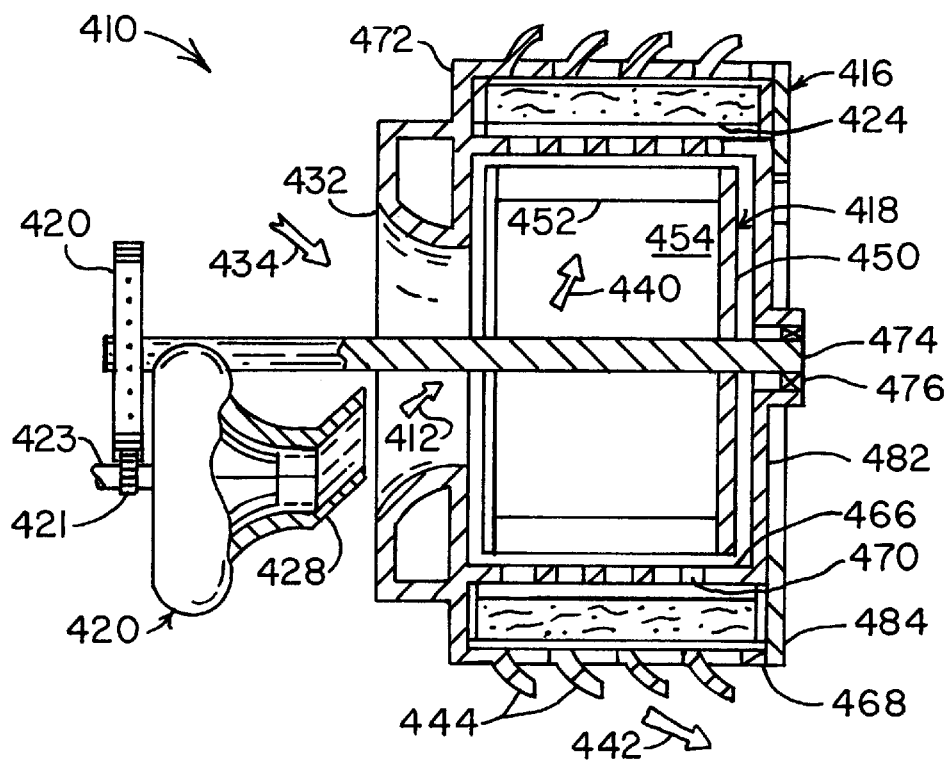
FIG. 6 is a cross-sectional view in elevation of a fifth embodiment of an exhaust filtration system wherein the fan assembly is operatively connected with an exhaust gas driven turbine assembly.

The fan housing 16 is sized to receive the fan assembly 18. In one preferred embodiment, the fan assembly 18 may comprise a centrifugal fan 50 having a plurality of impellers 52 attached thereto. The centrifugal fan 50 may be mounted to a shaft 74 which may be journalled for rotation in the housing 16 by any convenient device, such as by a plurality of ball bearings 76. The bearings 76 allow the shaft 74 and centrifugal fan assembly 50 to rotate about fan axis 30, generally in the direction indicated by arrow 56. The centrifugal fan 50 may be driven by any of a wide range of devices and systems. For example, in one preferred embodiment, centrifugal fan 50 may be driven directly by the engine 14 via a pulley 20 and drive belt 22, as best seen in FIG. 1. Alternatively, the centrifugal fan may be driven by an electric or a hydraulic motor (not shown). In still another configuration, the fan 50 may be driven by a turbine associated with the exhaust system, as illustrated in FIG. 6.

When rotated about the fan axis 30, the centrifugal fan 50 pumps air (e.g., cooled, diluted exhaust gases 40) generally radially outward. That is, fan 50 pumps air from the interior region 54 of centrifugal fan 50 out through the apertures 70 in inner wall 66, through the filter element 24, and ultimately outward through the louvers 44 provided in the outer wall 68. In accordance with the foregoing function, then, centrifugal fan 50 may comprise any of a wide variety of centrifugal-type fans or blowers that are well-known in the art and that are readily commercially available. Consequently, the present invention should not be regarded as limited to any particular type of fan or blower assembly 18.

The overall size and capacity of the centrifugal fan 50 will depend to a large extent by the size of the engine 14 on which it is to be used. Generally speaking, larger displacement engines will require larger fans. The size of the fan 50 is also related to some degree to the speed at which the fan is to be driven, with higher speeds generally allowing smaller fans to be used. Accordingly, the present invention should not be regarded as limited to a fan 50 having any particular size and capacity. However, by way of example, in one preferred embodiment for use with the diesel engine 14 described above, the fan 50 is sized so that it moves about 800 cubic feet per minute (cfm) of air when the engine 14 specified above is operated at substantially full load.

The housing 16 is also sized to receive a filter element 24 within the annulus defined between the inner and outer cylindrically shaped walls 66 and 68. Accordingly, the filter element 24 may comprise a generally ring-shaped filter element having an inlet surface 78 and an outlet surface 80, as best seen in FIG. 2. The front side 82 of housing 16 may be provided with a generally ring-shaped filter cover 84 to allow the filter element 24 to be periodically replaced. As mentioned above, the exhaust gas dilution provided by the induction of ambient air 34 substantially lowers the temperature of the exhaust gases 12 therefore allowing a relatively low-temperature filter element to be utilized. For example, in one preferred embodiment, the dilution of the exhaust gases 12 by the ambient air 34 lowers the temperature of the exhaust gases from about 1,000° F. to a temperature of about 300° F. Accordingly, the filter element 24 may comprise any of a wide variety of paper filters that are readily commercially available, provided of course that the filter material is designed to withstand the maximum temperature of the cooled, diluted exhaust gases 40. By way of example, in one preferred embodiment, the filter element 24 may comprise a disposable paper filter available from Dry Systems Technologies of Louisville, Colo. 80027.

The exhaust gases 12 from the engine 14 may be introduced into the interior region 54 of housing 16 by an exhaust gas influx tube 26 which may be essentially concentric with the ambient air inlet 32. The exhaust gas influx tube 26 may be attached to the exhaust manifold 36 of the engine 14 by any convenient conduit member, such as exhaust pipe 38. Alternatively, if the engine 14 is provided with a catalyst assembly 58, then the influx tube 26 may be attached to the outlet end 64 of catalyst assembly 58 in the manner illustrated in FIG. 1. The exhaust gas influx tube 26 may be provided with one or more holes or perforations 28 therein to more evenly distribute the exhaust gases 12 along the axial length of the interior chamber 54. The exhaust gas influx tube 26 may be provided with an inlet bell 88 to help smooth the flow of ambient air 34 as it enters the ambient air inlet 32. The housing 16 of the exhaust filtration system 10 then may be attached to the inlet bell 88 by a plurality of struts 86, as best seen in FIG. 1. Alternatively, other mounting arrangements are possible and the present invention should not be regarded as limited to the particular mounting arrangement shown and described herein.

The exhaust filtration system 10 according to one embodiment of the present invention may be operated as follows to remove a substantial portion of the particulate matter (not shown) contained in the exhaust gases 12 produced by the engine 14. Assuming that the engine 14 has been started and is operating, the engine 14 will also be rotating the centrifugal fan 50 via the drive belt 22 and pulley 20 arrangement. The rotating centrifugal fan 50 draws in ambient air 34 through the ambient air inlet 32. Exhaust gases 12 exiting the perforations 28 in the influx tube 26 mix with the ambient air 34 to produce cooled, diluted exhaust gases 40. The cooled, diluted exhaust gases 40 are pumped by the impellers 52 of rotating fan 50 through the plurality of holes 70 contained in the inner wall 66. Thereafter, the cooled, diluted exhaust gases 40 pass through the filter element 24 before ultimately being discharged as filtered exhaust gases 42 from the louvers 44 provided in the outer wall 68 of housing 16. The filter element 24 traps a substantial portion of the particulate matter entrained in the cooled, diluted exhaust gases 40.

The amount of ambient air that is to be drawn into the housing 16 to dilute the exhaust gases will depend on a wide variety of factors, including the expected temperature of the ambient air 34, the temperature of the exhaust gases 12, the temperature rating of the filter, and the overall size (e.g., horsepower rating) of the engine 14, just to name a few. However, good results can usually be obtained if the ratio (on a volume basis) of ambient air 34 to exhaust gases 12 is in the range of about 12:1 to about 6:1 (about 8:1 preferred). In most applications, the foregoing volume ratios will result in the cooled, diluted exhaust gases 40 having a temperature below about 300° F.

Figure 3:
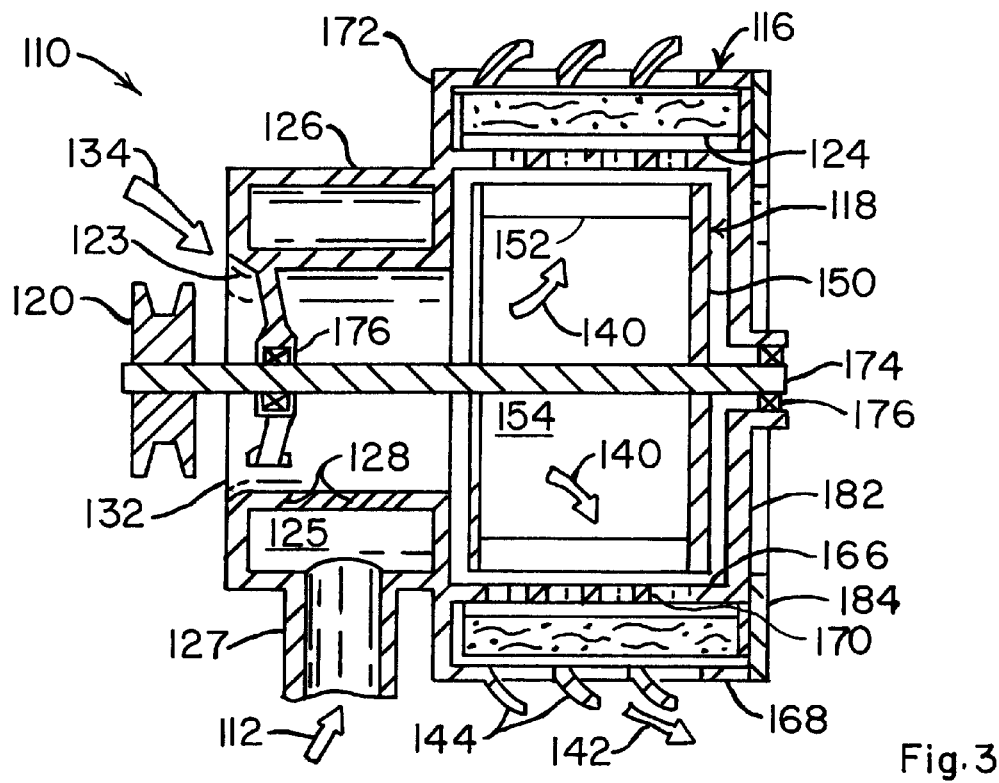
FIG. 3 is a cross-sectional view in elevation of a second embodiment of an exhaust filtration system having an annular exhaust gas influx tube.

A second embodiment 110 of an exhaust filtration system according to the present invention is shown in FIG. 3. The second embodiment 110 differs from the first embodiment 10 described above in that it utilizes an annular influx ring 126 as well as a modified shaft arrangement for rotating the fan assembly 118. More specifically, the second embodiment 110 may be provided with a generally cylindrically shaped housing 116 sized to receive the fan or blower assembly 118 and a filter element 124. The construction of the housing assembly 116 is similar to the housing assembly 16 shown and described above and may include a generally cylindrically shaped inner wall 166 that is surrounded by a generally cylindrically shaped outer wall 168 so that a filter annulus is defined therebetween. The inner wall 166 may be provided with one or more holes 170 therein to allow cooled, diluted exhaust gases 140 to pass into the filter annulus. The outer wall 168 may be provided with one or more apertures, such as louvers 144, to allow filtered exhaust gases 142 to be discharged into the surrounding atmosphere. The side 182 of housing 116 may be provided with a ring-shaped filter cover 184 to allow the filter element 124 to be replaced periodically.

The annular influx ring 126 introduces the exhaust gases 112 into the interior region 154 of housing 116. In one embodiment, the annular influx ring 126 may be positioned adjacent the side panel 172 of housing assembly 116 and may comprise a generally ring-shaped member having an annular exhaust gas distribution chamber 125 therein. The annular influx ring 126 may be provided with an inlet port 127 to allow exhaust gases 112 from the engine to enter the distribution chamber 125. The interior surface 123 of annular influx ring 126 defines an ambient air inlet 132 and may be provided with one or more discharge ports 128 to allow exhaust gases 112 to be discharged into the ambient air 134 being drawn through the ambient air inlet 132 by the fan assembly 118. The ambient air 134 dilutes the exhaust gases 112 emerging from the apertures 128 to produce cooled, diluted exhaust gases 140 which are drawn into the interior 154 of fan assembly 118.

As was the case for the first embodiment described above, the fan assembly 118 may comprise a centrifugal fan 150 having a plurality of impellers 152 mounted thereon. The centrifugal fan 150 may be mounted to a shaft 174 which may be journalled for rotation within the housing 116 by any convenient device, such as by ball bearings 176, in the manner illustrated in FIG. 3. Alternatively, the fan 150 and shaft 174 may comprise an arrangement substantially as shown in FIG. 2. The shaft 174 may be provided with a pulley 120 to allow the fan 150 to be driven by the engine in a manner similar to that shown in FIG. 1. Alternatively, the fan 150 may be driven by other devices, such as by a separate motor (not shown) which may be electrically or hydraulically operated.

The operation of the second embodiment 110 of the exhaust filtration system is essentially the same as for the first embodiment 10 described above, except that the exhaust gases 12 emerging from the apertures 128 are diluted by the ambient air 134 before entering the interior region 154 of fan 150. The movement of the ambient air 134 past the apertures 128 reduces the static pressure in the region of the apertures 128, thus helping to draw the exhaust gases 112 from the distribution chamber 125.

Figure 4:
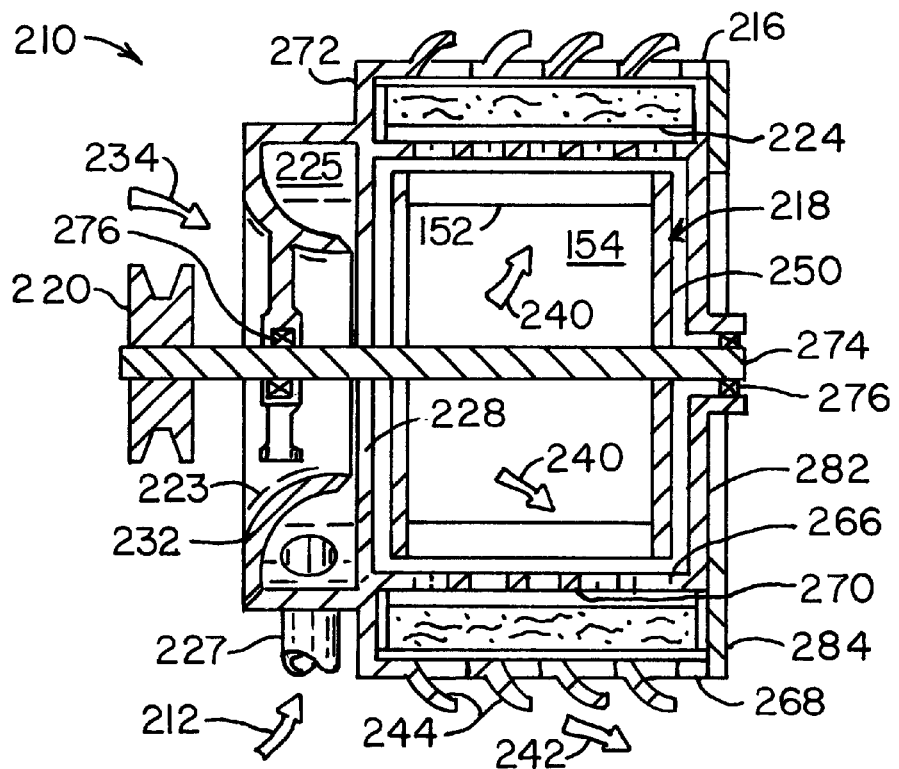
FIG. 4 is a cross-sectional view in elevation of a third embodiment of an exhaust filtration system having a modified annular exhaust gas influx tube.

A third embodiment of an exhaust filtration system 210 is shown in FIG. 4 and is similar to the second embodiment 110 just described except that it is provided with a modified annular influx ring 226. Referring now to FIG. 4, the third embodiment 210 may be provided with a generally cylindrically shaped housing 216 sized to receive a fan or blower assembly 218 and a filter element 224. The construction of the housing assembly 216 is similar to the housing assemblies 16 and 116 shown and described above and may include a generally cylindrically shaped inner wall 266 that is surrounded by a generally cylindrically shaped outer wall 268. The inner and outer walls 266 and 268 define an annulus sized to receive the filter element 224. The inner wall 266 may be provided with one or more holes 270 therein to allow cooled, diluted exhaust gases 240 to pass into the filter element 224. The outer wall 268 may be provided with one or more apertures, such as louvers 244, to allow filtered exhaust gases 242 to be discharged to the surrounding atmosphere. The side 282 of housing 216 may be provided with a ring-shaped filter cover 284 to allow the filter element 224 to be replaced periodically.

The modified annular influx ring 226 may be positioned adjacent the side panel 272 of housing assembly 216 and may comprise a generally ring-shaped member having an annular exhaust gas distribution chamber 225 therein. The annular influx ring 226 may be provided with at least one inlet port 227 to allow exhaust gases 212 from the engine to enter the distribution chamber 225. The interior surface 223 of annular influx ring 226 defines an ambient air inlet 232 and may be provided with one or more annular discharge slots 228 to allow exhaust gases 212 to be discharged into the ambient air 234 being drawn through the ambient air inlet 232. The ambient air 234 dilutes the exhaust gases 212 emerging from the slots 228 to produce cooled, diluted exhaust gases 240 which are drawn into the interior 254 of fan assembly 218.

As was the case for the other embodiments described above, the fan assembly 218 may comprise a centrifugal fan 250 having a plurality of impellers 252 mounted thereon. The centrifugal fan 250 may be mounted to a shaft 274 which may be journalled for rotation within the housing 216 by a plurality of ball bearings 276 in the manner illustrated in FIG. 4. Alternatively, the fan 250 and shaft 274 may comprise an arrangement substantially as shown in FIG. 2. The shaft 274 may be provided with a pulley 220 to allow the fan 250 to be driven by the engine in a manner similar to that shown in FIG. 1. Alternatively, the fan 250 may be driven by other devices, such as by a separate hydraulic or electric motor (not shown).

The operation of the third embodiment 210 of the exhaust filtration system is essentially identical to the operations of the first two embodiments 10 and 110 described above, except that the exhaust gases 212 emerging from the annular discharge slot 228 are diluted by the ambient air 234 as the ambient air passes through the ambient air inlet 232. The movement of the ambient air 234 past the annular discharge slot 228 reduces the static pressure in the region of the annular discharge slot 228, thus helping to draw the exhaust gases 212 from the distribution chamber 225.

Figure 5:
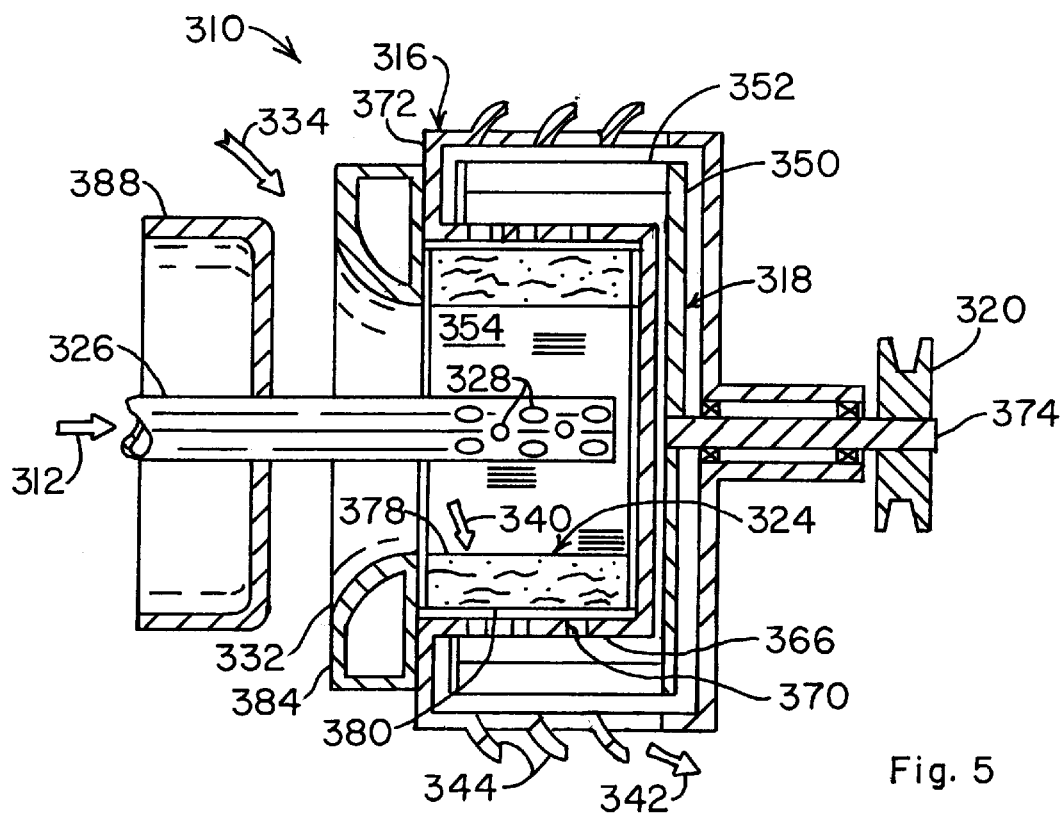
FIG. 5 is a cross-sectional view in elevation of a fourth embodiment of an exhaust filtration system having an internal filter element and an external fan.

Referring now to FIG. 5, a fourth embodiment 310 of the exhaust filtration system may comprise an inverse arrangement wherein the filter element 324 is positioned within the interior region 354 defined by the fan assembly 318. The fan assembly 318 therefore draws the cooled, diluted exhaust gases 340 through the filter element 324 before discharging filtered exhaust gases 342 into the surrounding atmosphere. The fourth embodiment 310 may be provided with a generally cylindrically shaped housing 316 having a generally cylindrically shaped inner wall 366 that is surrounded by a generally cylindrically shaped outer wall 368. The inner and outer walls 366 and 368 define an annulus sized to receive the fan assembly 316 in the manner that will be described below. The inner wall 366 may be provided with one or more holes 370 therein to allow filtered exhaust gases (e.g., 342) emerging from the filter to be drawn into the fan assembly 318. The outer wall 368 of housing 316 may be provided with one or more apertures, such as louvers 344, to allow the filtered exhaust gases 342 to be discharged into the surrounding atmosphere.

The side 372 of housing 316 may be provided with a ring-shaped filter cover 384 to allow the filter element 324 to be replaced periodically. The filter cover 384 may also be provided with a rounded aperture therein which functions as an ambient air inlet 332.

As was the case for the embodiments described above, the fan assembly 318 may comprise a centrifugal fan 350 having a plurality of impellers 352 mounted thereon. The centrifugal fan 350 may be mounted to a shaft 374 which may be journalled for rotation within the housing 316 by any convenient device, such as by ball bearings 376, in the manner illustrated in FIG. 5. Alternatively, the fan 350 and shaft 374 may comprise an arrangement substantially as shown in FIGS. 3 and 4 for the other embodiments 110 and 210. The shaft 374 may be provided with a pulley 320 to allow the fan 350 to be driven by the engine in a manner similar to that shown in FIG. 1. Alternatively, the fan 350 may be driven by other devices, such as by a separate electric or hydraulic motor (not shown).

The filter element 324 may comprise a generally ring-shaped member having an inlet surface 378 and an outlet surface 380. The filter element 324 may be retained within the housing 316 by the filter cover 384 which may be removable, as was described above, to allow the filter element 324 to be periodically replaced. The filter element 324 may comprise a relatively low-temperature disposable paper filter element of the type identified above for the other embodiments.

The exhaust gases 312 from the engine may be introduced into the interior region 354 of filter assembly 324 by an exhaust gas influx tube 326 which may be essentially concentric with the ambient air inlet 332. Alternatively, the exhaust influx tube 326 may comprise any of the other types of exhaust influx apparatus utilized in any of the other embodiments described herein. The exhaust gas influx tube 326 may be attached to the exhaust manifold 36 of the engine 14 (FIG. 1) by any convenient conduit member, such as exhaust pipe 38. Alternatively, if the engine 14 is provided with a catalyst assembly 58, then the influx tube 326 may be attached to the outlet end 64 of catalyst assembly 58 in the manner illustrated in FIG. 1. The exhaust gas influx tube 326 may be provided with one or more holes or perforations 328 therein to more evenly distribute the exhaust gases 312 along the axial length of the interior region 354. The exhaust gas influx tube 326 may be provided with an inlet bell 388 to help smooth the flow of ambient air 334 as it enters the ambient air inlet 332. The housing 316 of the exhaust filtration system 310 then may be attached to the inlet bell 388 by a plurality of struts 86, in the manner shown in FIG. 1 for the first embodiment 10. Alternatively, other mounting arrangements are possible and the present invention should not be regarded as limited to the particular mounting arrangement shown and described herein.

The operation of the fourth embodiment 310 of the exhaust filtration system is essentially the same as for the first embodiment 10 described above, except that the cooled, diluted exhaust gases 340 first pass through the filter element 324 before being pumped out of the housing 316 by the fan assembly 318.

A fifth embodiment 410 of the exhaust filtration system is shown in FIG. 6 and includes an exhaust-gas driven turbine assembly 420 for driving the fan assembly 418. The turbine assembly 420 may comprise a dedicated turbine provided solely for the purpose of driving the fan assembly 418. Alternatively, the turbine assembly 420 may comprise a portion of a turbo-supercharger assembly (not shown) having a compressor section (not shown) that is also connected to the turbine assembly 420. Referring now to FIG. 6, the fifth embodiment 410 may be provided with a generally cylindrically shaped housing 416 sized to receive a fan or blower assembly 418 and a filter element 424. The construction of the housing assembly 416 is similar to the housing assemblies 16, 116, etc., shown and described above and may include a generally cylindrically shaped inner wall 466 that is surrounded by a generally cylindrically shaped outer wall 468. The inner and outer walls 466 and 468 define an annulus sized to receive the filter element 424. The inner wall 466 may pe provided with one or more holes 470 therein to allow cooled, diluted exhaust gases 440 to pass into the filter element 424. The outer wall 468 may be provided with one or more apertures, such as louvers 444, to allow filtered exhaust gases 442 to be discharged into the surrounding atmosphere. A first side 482 of housing 416 may be provided with a ring-shaped filter cover 484 to allow the filter element 424 to be replaced periodically. A second side 472 of housing 416 may be provided with a ring-shaped annular inlet 432 in the manner shown in FIG. 6.

The fan assembly 418 may comprise a centrifugal fan 450 having a plurality of impellers 452 mounted thereon. The centrifugal fan 450 may be mounted to a shaft 474 which may be journalled for rotation within the housing 416 by ball bearing 476, as best seen in FIG. 6. Alternatively, the fan 450 and shaft 474 may comprise an arrangement substantially as shown in FIGS. 2, 3, or 4. The shaft 474 may be provided with a reduction gear 420 configured to mesh with a drive pinion 421 provided on the shaft 423 of the turbine assembly 420, thereby allowing the turbine assembly 420 to drive the fan 450.

The turbine assembly 420 may be provided with an exhaust gas outlet 428 which directs exhaust gases 412 into the ambient air inlet 432. Thereafter, the exhaust gases 412 are diluted with ambient air 434 to produce cooled, diluted exhaust gases 440. The centrifugal fan 450 then pumps the cooled, diluted exhaust gases 440 through the filter assembly 424 which removes the particulate matter and discharges filtered exhaust gases 442 into the surrounding atmosphere.

It is contemplated that the inventive concepts herein described may be variously otherwise embodied and it is intended that the appended claims be construed to include alternative embodiments of the invention except insofar as limited by the prior art.

What is claimed is:

1. An exhaust filtration system for filtering exhaust gases produced by an internal combustion engine, comprising:

a fan having an intake side and a discharge side;

an air inlet operatively associated with the intake side of said fan;

a filter having an inlet surface and an outlet surface, the inlet surface of said filter being positioned adjacent the discharge side of said fan; and an influx tube having an inlet end and an outlet end, the inlet end of said influx tube being connected to the internal combustion engine so that exhaust gases from the internal combustion engine enter said influx tube, the outlet end of said influx tube being positioned adjacent the intake side of said fan, so that said fan draws in air from said air inlet and exhaust gases from the outlet end of said influx tube and discharges a mixture of air and exhaust gases from the discharge side.

2. The exhaust filtration system of claim 1, wherein said fan comprises a generally cylindrically shaped impeller having an intake side and a discharge side.

3. The exhaust filtration system of claim 2, wherein said filter comprises a generally cylindrically shaped element having an inlet surface and an outlet surface, the inlet surface of said element being sized so that it surrounds the discharge side of said cylindrically shaped impeller.

4. The exhaust filtration system of claim 3, wherein the outlet end of said influx tube comprises a generally cylindrically shaped member having a plurality of holes therein positioned adjacent the intake side of said impeller so that exhaust gases from the internal combustion engine exit said influx tube through the plurality of holes and are drawn into the intake side of said impeller.

5. The exhaust filtration system of claim 3, wherein the outlet end of said influx tube comprises a generally annular shaped member having an elongate slot therein positioned adjacent the intake side of said impeller so that exhaust gases from the internal combustion engine exit said influx tube through the elongate slot and are drawn into the intake side of said impeller.

6. The exhaust filtration system of claim 3, wherein the outlet end of said influx tube comprises a generally annular shaped member having an aperture therein positioned adjacent the intake side of said impeller so that exhaust gases from the internal combustion engine exist said influx tube through the aperture and are drawn into the intake side of said impeller.

7. The exhaust filtration system of claim 1, further comprising a housing adapted to receive said fan so that said fan is free to rotate within said housing about a fan axis.

8. The exhaust filtration system of claim 7, wherein said fan is connected to said internal combustion engine so that said internal combustion engine rotates said fan about the fan axis.

9. The exhaust filtration system of claim 7, further comprising a motor operatively connected to said fan so that said motor rotates said fan about the fan axis.

10. The exhaust filtration system of claim 7, further comprising an exhaust-gas turbine operatively associated with the exhaust gases discharged by said internal combustion engine and wherein said fan is operatively associated with said exhaust-gas turbine so that said exhaust gas turbine rotates said fan about the fan axis.

11. An exhaust filtration system for filtering exhaust gases produced by an internal combustion engine, comprising:

a fan having an intake side and a discharge side;

a filter having an inlet surface and an outlet surface, the outlet surface of said filter being positioned adjacent the intake side of said fan;

an air inlet operatively associated with the inlet surface of said filter; and an influx tube having an inlet end and an outlet end, the inlet end of said influx tube being connected to the internal combustion engine so that exhaust gases from the internal combustion engine enter said influx tube, the outlet end of said influx tube being positioned adjacent the inlet surface of said filter, so that air from said air inlet and exhaust gases from the outlet end of said influx tube are drawn through said filter and are discharged from the discharge side of said fan.

12. The exhaust filtration system of claim 11, wherein said fan comprises a generally cylindrically shaped impeller having an intake side and a discharge side.

13. The exhaust filtration system of claim 12, wherein said filter comprises a generally cylindrically shaped element having an inlet surface and an outlet surface, the outlet surface of said element being sized so that it is surrounded by the intake side of said cylindrically shaped impeller.

14. The exhaust filtration system of claim 13, wherein the outlet end of said influx tube comprises a generally cylindrically shaped member having a plurality of holes therein positioned adjacent the inlet surface of said filter so that exhaust gases from the internal combustion engine exit said influx tube through the plurality of holes and are drawn into the inlet surface of said filter.

15. The exhaust filtration system of claim 13, wherein the outlet end of said influx tube comprises a generally annular shaped member having an elongate slot therein positioned adjacent the inlet surface of said filter so that exhaust gases from the internal combustion engine exit said influx tube through the elongate slot and are drawn into the inlet surface of said filter.

16. The exhaust filtration system of claim 13, wherein the outlet end of said influx tube comprises a generally annular shaped member having an aperture therein positioned adjacent the inlet surface of said filter so that exhaust gases from the internal combustion engine exist said influx tube through the aperture and are drawn into the inlet surface of said filter.

17. The exhaust filtration system of claim 11, further comprising a housing adapted to receive said fan so that said fan is free to rotate within said housing about a fan axis.

18. The exhaust filtration system of claim 17, wherein said fan is operatively associated with said internal combustion engine so that said internal combustion engine rotates said fan about the fan axis.

19. The exhaust filtration system of claim 17, further comprising a motor operatively connected to said fan so that said motor rotates said fan about the fan axis.

20. The exhaust filtration system of claim 17, further comprising an exhaust-gas turbine operatively associated with the exhaust gases discharged by said internal combustion engine and wherein said fan is operatively associated with said exhaust-gas turbine so that said exhaust gas turbine rotates said fan about the fan axis.

21. An exhaust filtration system for filtering exhaust gases produced by an internal combustion engine, comprising:

fan means for pumping gases from an intake side to a discharge side;

air inlet means operatively associated with said fan means for allowing air to be drawn into said fan means;

influx tube means operatively associated with the internal combustion engine and said fan means for allowing exhaust gases from the internal combustion engine to be drawn into said fan means, exhaust gases from said influx tube means mixing with air from said air inlet means to produce diluted exhaust gases before being drawn into said fan means; and filter means operatively associated with said fan means for filtering diluted exhaust gases.

22. The exhaust filtration system of claim 21, wherein said filter means is positioned adjacent the discharge side of said fan means so that the diluted exhaust gases are pumped from the intake side to the discharge side of said fan means before passing through said filter means.

23. The exhaust filtration system of claim 21, wherein said filter means is positioned adjacent the intake side of said fan means so that the diluted exhaust gases pass through said filter means before being drawn into the intake side of said fan means.

\* \* \* \* \*

UNITED STATES PATENT AND TRADEMARK OFFICE
CERTIFICATE OF CORRECTION

PATENT NO.   : 6,502,392 B1
DATED        : January 7, 2003
INVENTOR(S)  : Nobert Paas It is certified that error appears in the above-identified patent and that said Letters Patent is hereby corrected as shown below:

Column 4,
Line 13, please delete the word "for";

Column 10,
Line 29, please delete the word "pe" and insert the word -- be -- in its place;

Column 11,
Line 41, please delete the word "exist" and insert the word -- exit -- in its place;

Column 12,
Line 35, please delete the word "exist" and insert the word -- exit -- in its place.

Signed and Sealed this

Twenty-fourth Day of February, 2004

JON W. DUDAS
*Acting Director of the United States Patent and Trademark Office*